US006234549B1

(12) United States Patent
Brownell

(10) Patent No.: US 6,234,549 B1
(45) Date of Patent: *May 22, 2001

(54) DUAL ACTION SCOOPER FOR CLUMPING AND NON-CLUMPING CAT LITTER

(75) Inventor: Marcia A. Brownell, Lancaster, CA (US)

(73) Assignee: Louis E. Spencer, Landcaster, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,373

(22) Filed: Dec. 29, 1997

(51) Int. Cl.$^7$ .................................................. A01K 29/00
(52) U.S. Cl. ............................................ 294/1.3; 294/55
(58) Field of Search .................................. 294/1.3, 1.4, 7, 294/49, 54.5, 55, 56, 59; 15/257.1, 257.2, 257.6; 209/417–419; D8/10; D30/162; D32/74

(56) References Cited

U.S. PATENT DOCUMENTS

| D. 194,509 | * | 2/1963 | Beder ..................................... D32/74 |
| D. 233,158 | | 10/1974 | Lowe ..................................... D30/99 |
| D. 255,951 | | 7/1980 | Halls et al. ........................... D30/99 |
| D. 256,173 | | 7/1980 | Rigney ................................. D30/99 |
| D. 257,406 | | 10/1980 | Ouellette ............................. D30/99 |
| D. 332,675 | | 1/1993 | Simon ................................. D30/162 |
| D. 335,011 | | 4/1993 | Feldman ............................. D32/74 |
| D. 342,426 | | 12/1993 | Concari ............................... D8/10 |
| D. 345,238 | | 3/1994 | Berti ................................... D32/74 |
| D. 347,494 | | 5/1994 | VanSkiver ......................... D30/162 |
| D. 347,497 | * | 5/1994 | VanSkiver ......................... 294/1.3 X |
| 668,982 | * | 2/1901 | Covel ................................... 294/55 |
| 868,887 | * | 10/1907 | Rich .................................... 15/257.6 |
| 1,094,161 | | 4/1914 | Mueller . |
| 1,165,574 | | 12/1915 | Davidson . |
| 1,175,192 | | 3/1916 | Tankersley . |
| 1,404,466 | * | 1/1922 | Miller ................................. 15/257.1 |
| 2,563,223 | * | 8/1951 | Dreher ................................. 294/55 |
| 3,380,101 | * | 4/1968 | Phillips ............................. 15/257.1 |
| 5,076,627 | | 12/1991 | Simon ................................. 294/1.3 |
| 5,738,399 | * | 4/1998 | Mitchell ............................ 294/1.3 |

FOREIGN PATENT DOCUMENTS

| 323906 | * | 1/1930 | (GB) ..................................... 294/55 |
| 481624 | * | 3/1938 | (GB) ..................................... 294/56 |

* cited by examiner

Primary Examiner—Johnny D. Cherry
(74) Attorney, Agent, or Firm—R. W. VonHeck; Inventech/USA

(57) ABSTRACT

An improved hand-held two-stage cat-litter scooper tool critically configured to more effectively segregate and lift-away wet cat-litter, without causing migration into, or disturbing clean dry areas. The planar leading-edge of the scooping-blade portion, is formed to either a 90-degree triangular, or transversely-square, plan-view shape; either shape thus able to project closely into the corners of a conventional cat-litter box. The rear portion of either scooping-blade includes an approximate 40-degree transverse-bend, creating an aftward containment-bowl area, effectively holding wet cat-litter when the rearward projecting handle is tilted down (the scooping-blade thus tilting upward) after a horizontal forward scooping motion. The handle is arranged along the medial longitudinal-axis of the tool, angling upward at approximately 45-degrees relative to the plane of the scooping-blade, facilitating the special "tilt-loading action" without dragging of one's hand into the cat-litter. A further aid to performance of the tool being shoved through soiled cat-litter, includes acutely up-turned blade sides; both set slightly back from the actual frontal-sides of the scooping-blade. This particular formation being discovered to function most effectively, providing minimal disturbance to surrounding cat-litter, while very precisely shaving away waste cat-litter. Generic-variations include a preferred 2-piece construction, embodying a stainless-steel blade portion, permanently locking into a retention-groove formed into the aftward injection-molded plastic-body forming the side-walls of the essential containment-bowl; including an integral handle member thereto.

20 Claims, 2 Drawing Sheets

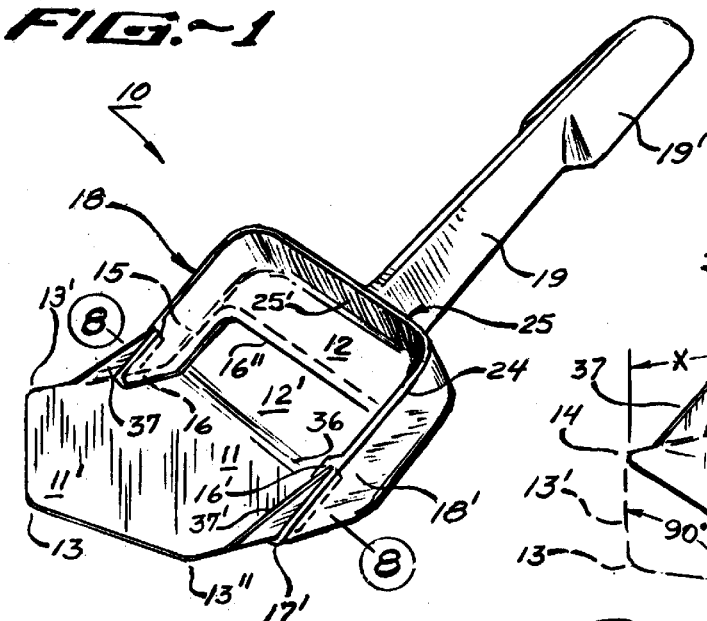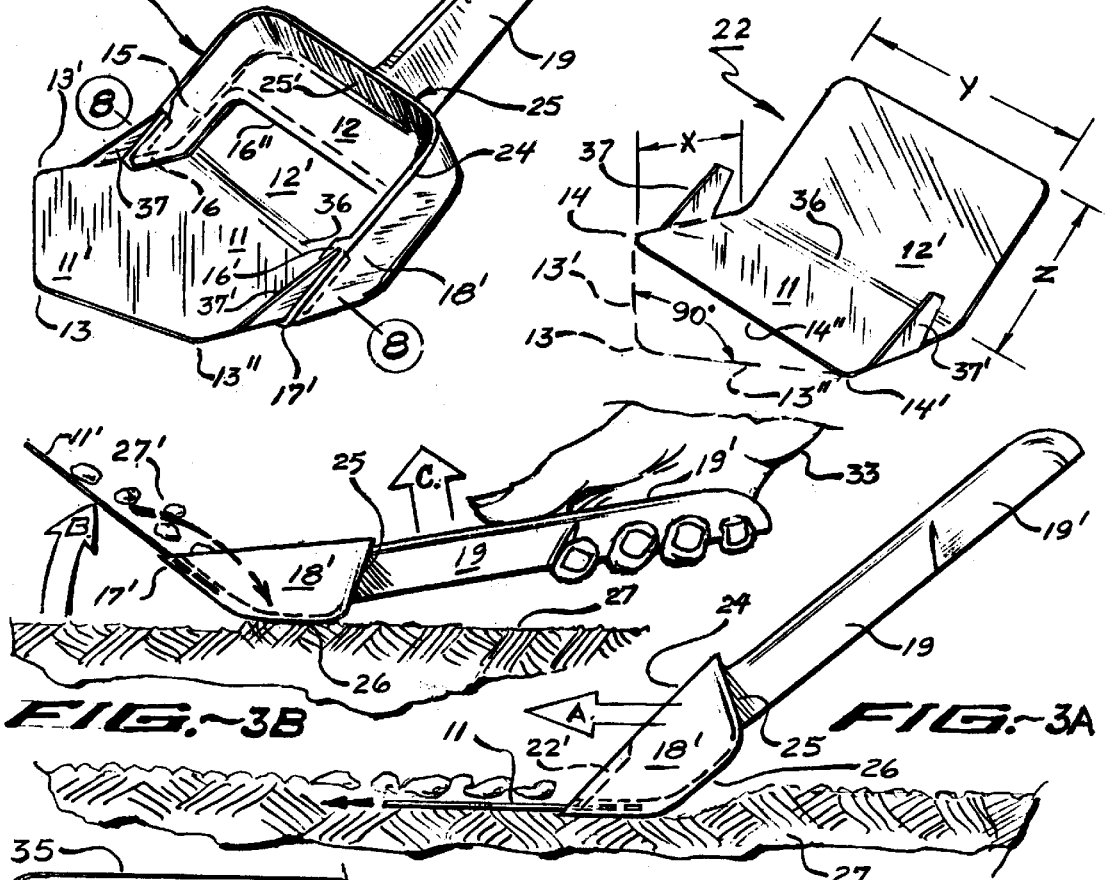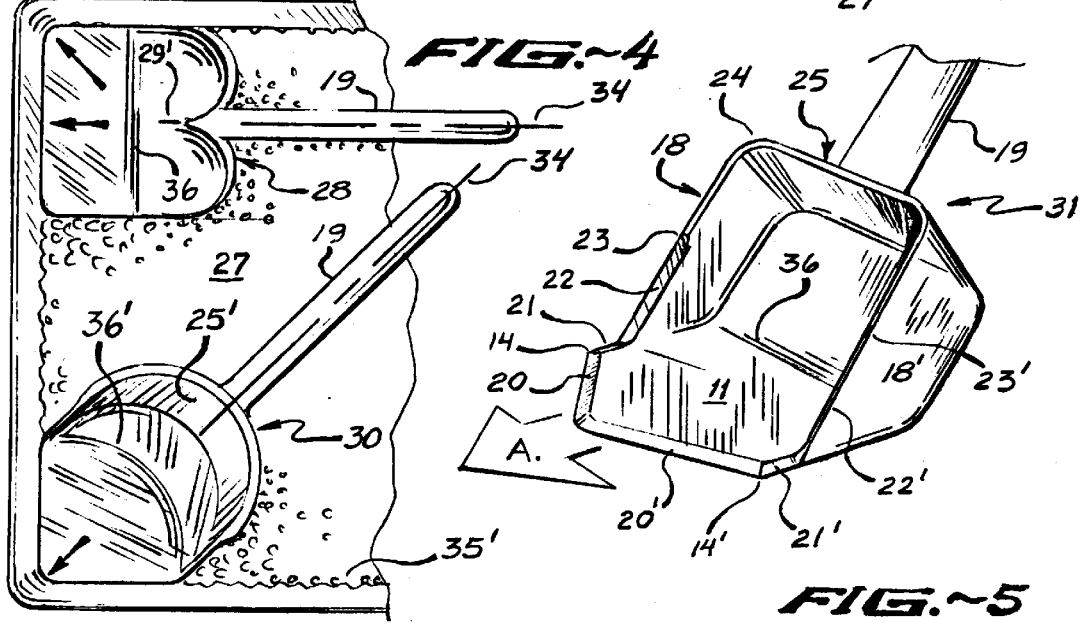

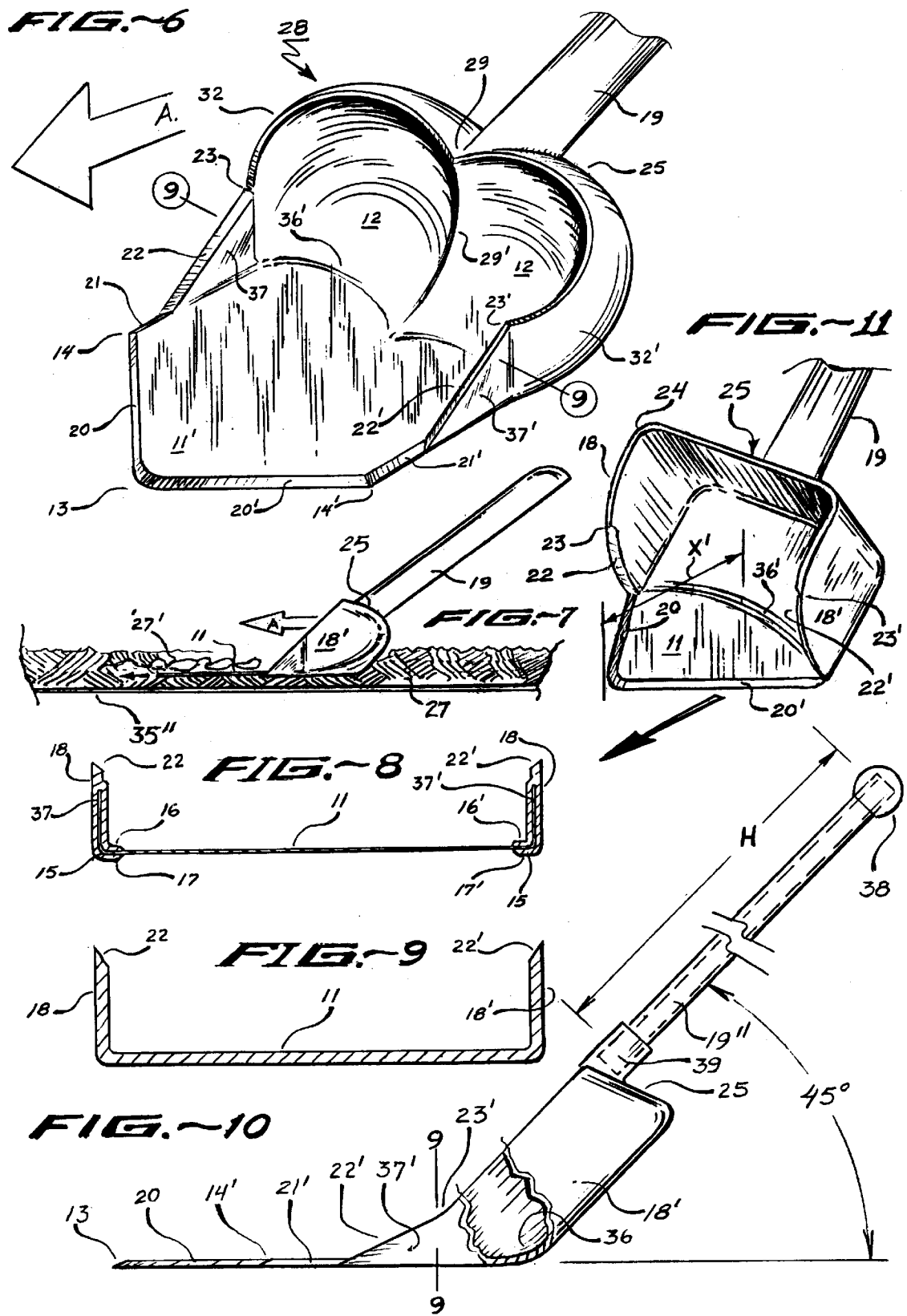

DUAL ACTION SCOOPER FOR CLUMPING AND NON-CLUMPING CAT LITTER

FIELD OF INVENTION

This invention relates to hand held portable devices such as trowels, and more specifically, it relates to cat-litter scoopers employed in the process of sifting out the contaminated debris.

BACKGROUND OF INVENTION

The basic background and purpose of virtually all cat-litter scoopers, which have been and are commonly available today, are as a trowel like tool to remove solid waste materials from cat-litter. They are all made with holes or perforations, so that the solids can be picked up, while letting the loose litter fall through. Hence, to that extent they are essentially sifters.

Up until the last few years, they were used only to remove solid, feline feces, but now since the advent of the more modern, expensive, "clumping" cat-litter, they are also used to remove urine. This is made possible because the urine turns into a solid clump which can be removed with any ordinary cat-litter scooper, even though the scooper is full of holes. A major disadvantage of this method is that this new clumping cat-litter is markedly more expensive than the regular, old-fashioned cat-litter, which does not "clump". Usually, the clumping cat-litter is around triple the price, which is the reason the old-fashioned cat-litter is still selling quite well. Many people who have multiple cat homes have never even used the new clumping litter owing to the exorbitant price of the new material, even though they dislike the wasteful necessity of discarding the entire cat-litter box contents just to dispose of a few odorous wet-spots. Then the cat-litter box usually needs scrubbing. If there were provided a method to remove the wet-spots by some kind of improved means, then a mere small amount of fresh cat-litter could be simply added to the removed areas; a much more economical procedure.

Recently, a multitude of environmentally friendly cat-litters have been put on the market which are not made of clay like the clumping cat-litter and old-fashioned non-clumping cat-litter, which do not break down easily in the environment. These new cat-litters are made of a variety of shavings and pellets. Presently, there is no way to remove the wet spots out of them because they do not clump, otherwise, these cat-litters would likely be more commonly used.

PRIOR ART REVIEW

Cat-litter scoopers that are commonly available are generally made of a relatively inexpensive, one-piece molded-plastic construction. A small shovel shown in U.S. Pat. No. 1,094,161 (Filed: October/1913) would not hold litter, since the body is made of a screen like construction.

A shovel meant to be used for sifting ashes, shown in U.S. Pat. No. 1,165,574 (Filed: February/1915) would also be useless for picking up cat-litter, since it is partly made of screen like material.

In U.S. Pat. No. 1,175,192 (October/1915) is shown a hand-guard attachment for a shovel, which rises up at the rear of the shovel, but is only meant to protect the hand and would not be able to contain cat-litter.

The Cat-litter scooper in U.S. Pat. No. D233,158 (Filed: September/1972) also has many perforations on the bottom surface.

Another pet-litter retriever U.S. Pat. No. D255,951 (Filed: February/1978) would also not be useful to pick up cat-litter, since the bottom of it is made up of perforations.

Another pet scooper in U.S. Pat. No. D256,173 (Filed: March/1978) is curved on the bottom of both models presented. One model has holes on its bottom, and neither has a handle, which is essential for the scooping and tilting to pick up the wet cat-litter. Also, they are without any V'ed shape leading edge, and provide no transverse-bend defining a containment area, nor do they chamfer the leading-edge portion of the blade.

Another pet-litter retriever in U.S. Pat. No. D257,406 (Filed: March/1978) has no V'ed shape leading edge nor extremely thin metal leading edge which is crucial for getting under the wet litter. It lacks a triangular shaped frontal blade, which assists the particular thinness of my cat-litter scooper blade in effectively going under the wet cat-litter. Also, it has no containment-bowl portion to entrap the cat-litter without getting it on the user's hand. The patent drawings show an open area from the frontal blade, all along the handle, which if tilted back slightly, would undesirably slide the cat-litter back into ones hand. Moreover, the upturned frontal sides would merely act to shove the wet cat-litter forward, while the object of my invention is to get it on the frontal blade portion and not to shove it.

Another cat-litter scooper shown in U.S. Pat. No. 5,076,627 (Filed: February/1990), has elongated slots along the sides and rear of the scooper, which would allow cat-litter to undesirably escape.

In reference to prior patents on file for cat-litter scoopers and trowels, a typical cat-litter scooper available now is U.S. Pat. No. D332,675 (Filed: October/1990). It is made of plastic and the scoop portion is perforated with holes, plus it has vertical teeth on the bottom so it will not touch the floor of the litter box. Both of these features render it essentially useless for removing wet litter.

Another dust-pan in U.S. Pat. No. D335,011 (Filed: December/1990) does not possess a blade that is entirely without upturned frontal sides nor frontal sides that are chamfered. It is too wide to be used in a cat-litter box. A side view shows that it is without a transverse bend. Dust-pans are generally held stationary while material is swept into it, which operation is opposite that of a moving cat-litter scooper.

A commonly available garden-trowel which many people own, typical of the many types of trowels that the instant inventor hereof has tested for the purpose of removing wet cat-litter from a cat-litter box, is shown in U.S. Pat. No. D342,426 (Filed: July/1991). This configuration is not effective in picking up cat-litter, since the frontal leading edge is not thin enough or otherwise chamfered in leading edge; it tends to merely shove wet cat-litter onto the dry clean areas, instead of the litter sliding up on the blade; a problematical tendency which was consistently repeated on the many trowels tested. Also this trowel has a curved bottom, as most others, which prevents a single sweep along the floor of the cat-litter box; plus, the arched leading edge would not fit neatly into a cat-litter box corner nor move evenly along the sides of a cat-box. A cat-litter box has generally straight sides, thus a straight line on some part of the leading edge is essential, since many times the cat urine fans out, as a wake, until it is stopped at the walls of the litter box.

The dust-pan shown in U.S. Pat. No. D345,238 (Filed: January/1992) does not have a flat bottom nor a frontal blade that is without upturned sides where it would first contact the material to be scooped up. It is too wide to be used in a cat-litter box, and its leading edges are not chamfered.

A cat-litter scoop in U.S. Pat. No. D347,497 (filed: May/1994) shows a configuration capable of picking-up both the cat's solid-feces and the newer more costly clumping type cat-litter material; -the myriad surface perforations allowing the wetted but unclumped cat-litter to fall away back via gravity into the cat-litter box. Ten underside nodules apparently serve to lift the bottom of the tool up from a countertop-surface for better drying when washed clean: yet the ten protrusions tend to cause drag in the cat-litter which is antithetic to the objectives to be set forth for the new art hereof. Since the older "cheap" type cat-litter material does not clump while absorbing the cats urine, the soiled older type cat-litter would not effectively be held captive for disposal in this scooper.

A cat-litter scoop in U.S. Pat. No. 5,738,399 (filed: October/1996) shows a configuration similar to above noted . . . 497, specifically devised to pick-up both solid cat-feces and the newer more costly "clumping"-type cat-litter material, while the myriad surface perforations allow the unwetted cat-litter to fall away via gravity back into the cat-litter box. The FIGS. 6–8 serve to demonstrate how the scooper-tool is actually tipped forward while moving forward through the occasionally clumped cat-litter material, whereupon the hand-tool is leveled and raised to allow the unwetted material to sift back into the cat-litter tray.

None of the models mentioned here (nor could any others be found) had a blade that is necessarily without upturned sides at the frontal sides of the blade, which is found to be crucial for getting under wet cat-litter. Furthermore, none could be found that had a relatively wide chamfered leading edge (as observed from plan-view) in proportion to the scooper, nor an alternate distinct thinness; and none had a transverse-bend, nor a non-stick coating.

Interestingly, reports have been forthcoming during the past year, pointing out adverse side effects to the health of cats from the newer type so-called "clumping" cat-litter. A nationally syndicated newspaper article appeared in the San Diego/Union-Tribune (Sep. 26, 1996), entitled "To Clump Or Not To Clump", stating "Veterinarians are voicing alarm about respiratory illnesses, especially in smaller cats and kittens after using clumping cat-litter. The problematical cat-litter has a finer texture than non-clumping cat-litter, causing it to degenerate into a powdery substance as a cat digs in it. The shorter the cat, the closer its face is to this substance, causing it to breathe more of it than might a taller cat." Other reports of cats becoming ill after using the clumping cat-litter, prompted a national cat-fanciers magazine to publish a harshly critical article about the new clumping cat-litter. The newspaper article, held on file by this inventor, also sites complaints of cats becoming sick after the fine clay-granules of clumping cat-litter stuck to their paws, which was then ingested while grooming themselves.

Other complaints, in the newspaper article, unrelated to cats health, were that the fine granules caused messy tracking around the cat-litter box, and that the cat-litter clumps, if not promptly removed, broke down or crumbled causing a contaminated area that could not be effectively removed by any cat-litter scooper presently available on the market.

Also on file by this inventor, is a video-tape relating another exposé aired Oct. 11, 1996 on a local T.V./news-station, in which a Veterinarian issued a warning to cat owners that she has treated numerous cats for the debilitating substance. Relating that "some cats become ill after exposure to the more costly clumping type cat-litter, which has a tendency to support the growth of bacteria, adversely affecting a cat's health." She thus advises people "only use the cheaper, non-clumping, traditional, healthy cat-litter."

Cat care books, recently published, are also beginning to issue warnings about clumping litter. For example, in the book, "Cat Care Naturally", by Celeste Yarnell, it states that clumping litter is collected in the intestines of cats that have ingested it while grooming, and that the clay particles are not entirely passed out of the digestive tract, leading to disease.

Therefore in full consideration of the preceding patent art review, there is a determined need for an improved form of device to which these patents have been largely directed. The instant inventor hereof believes her newly improved cat-litter scooper-tool commercially referred to as the PIDDLE-PITCHER™ exhibits certain advantages as shall be revealed in the following portion of this instant disclosure.

SUMMARY OF INVENTION

Accordingly, one objective of my timely improved scooper-tool is to very effectively segregate and remove the wet cat-litter areas, thereby obviating need and added expense of the clumping cat-litter and associated concerns about potential health-hazards to cats, A.) My cat-litter scooper will pick up the cat-litter most effectively if it is comprised of these combination features; a.) being smooth, and flat on the bottom; b.) having no upturned sides at the leading edge; c.) employing having a triangular shaped blade in front; d.) possessing a scooping-blade made of thin metal, or a scooping-blade possessing an upwardly chamfered (as though filed along upper-edge side) leading edge; eliminating even one of these features, could cause its effectiveness at picking up wet cat-litter to be markedly diminished. The key to its effectiveness resides in the aforementioned combined features due to the extreme resistance of wet cat-litter to slide upon any blade, but instead only to be shoved around. Using any commonly available trowel or scooper today, the user will find that the wet cat-litter will "travel" and mix in with the clean, dry cat-litter before it will at last slide upon the blade. Also, no scoopers or trowels could be found that had a blade projected forward from a transverse-bend, so that once the litter is secured upon the blade, it can then be tilted backward into the containment area having sidewalls which insure it will not fall off of the blade, before it can be captured and disposed of.

An object of this invention is to provide a wet-spot (urine) remover, cat-litter scooper having an imperforate planar-scooping blade and an imperforate containment-bowl portion which is therefore made unlike a trowel. It is devised to be used with ordinary, non-clumping, inexpensive cat-litter. By using this cat-litter scooper to remove the wet areas and not having to buy the more expensive "clumping" cat-litter, the user will save at least 60-percent in cost. It is made very differently from other cat-litter scoopers because it's surfaces have no holes, slots nor perforations. It is made this way to pick up solid cat feces and in the case of the more expensive, clumping cat-litter, the clumps which the urine has formed. Problematically, every cat-litter scooper available on the market today is made generally in the form of a "sifter" to sift out solids; my cat-litter scooper is not meant to necessarily replace these, but may be used in conjunction with one of them, when using regular inexpensive cat-litter.

B.) My "PIDDLE-PITCHER"™ cat-litter scooper tool is specifically constructed to avoid shoving the wet urinated litter, onto the dry clean areas of the cat-litter. By numerous experiments, it has been found that the components and dynamics of the non-clumping litter, when wet, actually require a special tool in order to be scooped up effectively, owing to a marked tendency not to slide readily onto any blade or utensil, but instead to travel firstly around, thereby contaminating the otherwise clean areas of the cat-litter. It is so extremely resistant to being scooped up that this inventor tried using every commonly available trowel on the market today for this purpose and the results were always the same, merely shoving of the wet area onto the dry area. Various other utensils, tools, spoons and spatulas were also tried, with the same disappointing result. Numerous scoopers made for flour, grain and miscellaneous purposes were also tested which only shoved the wet cat-litter into the dry. These existing devices work only after the wet cat-litter has thus become moved around, and undesirably mixed with the clean cat-litter, that it may slide upon the blade of a regular scooper or trowel.

It is practically impossible to obtain the cat-litter on the blade of a putty-scraper, or to keep it from sliding off while lifting the blade from the cat-litter. Because putty-scrapers do not possess a transverse bend or an upwardly slanted handle, they enter and exit the cat-litter from an ineffectual angle for removing cat-litter. Similarly, the blade of a pie server is much too narrow to obtain an adequate scoop of cat-litter, and it does not possess a containment-bowl portion to keep the cat-litter secured.

When ordinary cat-litter scoopers, (even with tape placed over their holes) were tried, their frontal blades all lacked the distinct thinness and formation for the wet cat-litter to readily slide onto them, as they were not actually designed for this purpose. In all these attempts, the wet cat-litter was only shoved onto the dry cat-litter, and because of these countless, futile attempts, it was assessed to be necessary to design a radically different cat-litter scooper, that could skim under the wet cat-litter and discretely lift it up without disturbing the dry surrounding cat-litter. A special type of blade would be required to subterrane under the cat-litter.

C.) Another object of my cat-litter scooper is to provide a scooping-blade having a very thin transversely (laterally straight across) square shape in plan-view without the immediate, frontal sides bent upwards; as it was discovered while conducting developmental experiments, that if the upturned frontal sides were removed, the square of metal was substantially more successful at picking up the cat-litter with a minimum shoving of the cat-litter. It was then discovered that if the leading edge shape was changed to a triangle instead of a square, the shoving phenomenon disappeared entirely. These novel discoveries, by the inventor explained why all the numerous trowels and scoopers that were tested for this purpose were a substantial failure. It was apparent that any upturned sides on the frontal edges where the scooper first contacts the cat-litter, or leading-edge thickness greater than approximately 1/16-inch, will produce unwanted drag or resistance, which contributes to adverse shoving. If the scooping-blade was made of plastic, it could also be made to be effective for picking up wet cat-litter if it had a relatively wide ramp-like chamfered edges, preferably at least 1/4 inch across. If the scooping-blade is of metal, the ideal gauge of thickness seems to be preferably 1/64th–1/32nd of an inch (or in any case, not exceeding 1 mm in thickness); if any thinner, it tended not to retain its shape after several uses. Any thicker, and the scooping-blade tends to shove the cat-litter around, just like any other scooper or trowel is found to do.

It is considered vital to the performance of this cat-litter scooper that the scooping-blade's leading-edge and outer-most right and left side edges have no up or down turned edging rim or beading of any sort, as the thinness of these edges is essential to enabling the scooping-blade to slide readily into the wet cat-litter with minimum disturbance. It is also vital that the scooping-blade be planar on the bottom in order to avoid upturned sides at the frontal leading edge; and in the triangular blade models, there is a straight longitudinal projection area emerging from a transverse-bend, going from side-to-side at a right-angle to the central longitudinal plane of reference. This straight projection extends the leading edge forward from the beginnings of the upturned sides. Another reason for the straight projection area is that although any of the models with straight sides, will easily fit into a cat-litter box corner, when the cat-litter containment-bowl possesses a bulged out contour, that shape would prevent the scooping-blade from fitting into the corner, except on all the triangular scooping-blade models with the straight lateral projection. The straight lateral projection portion extends the triangle forward enough that the bulged out containment-bowl contour does not interfere with the triangle fitting into the cat-litter box corners. Without the straight, lateral projection area, a triangle that will fit closely into a cat-litter box corner is too short and stubby to be useful, unless it is excessively wide (A minimum of 7-inches wide). This problem can be modified, by not having the transverse bend formed straight, but instead having it shaped in an arched configuration, with the arch of the partial circular shape directed centrally aftward. Then the straight projection area can be eliminated and the side-wings can be optional, since this type of triangle would provide an ever widening surface for the cat-litter to flow aftward over as it goes into the containment-bowl portion. However, the longitudinal depth that is added to the blade by the arch formation is limited, while the length added by the straight projection area is not. Also, a triangle emerging directly out of the transverse-bend without the straight projection area, can not possess a containment-bowl area that has bulged-out sidewalls, (which is otherwise advantageous for retaining cat-litter) and still be able to fit into a cat-litter-box corner or go flush to the sides of the cat-litter box.

Another object of this improved cat-litter scooper is to provide a scooping-blade that is of the proper width to obtain the wet cat-litter, without being so unduly wide as to cause resistance. The width of the squared scooping-blades and the width of the triangular scooping-blade at the base of the triangle is 3½–4¾ inches (preferably 4 inches), any wider might contribute to unwanted resistance and shoving of the cat-litter. The triangle appears more elongated than its (preferably approximately 1¾ inch–2¼ inch) length because it has the advantage of being projected out from the scooper by a straight forwardly projection, emerging out of the transverse-bend, before the triangle actually begins forming (as viewed from the top). The straight projecting sides are not needed in the generic variant square scooping-blade models, because the square is the same length as the whole space taken up by the forward straight projection portion, and the triangular point. The straight, forwardly projecting portion is a minimum of preferably ½-inch-to 1 inch. The projection area serves to extend the leading-edge out at a distance from the frontal beginning of the upturned sides. It is of sufficient distance as to negate the undesired shoving of wet litter. The longer the straight, forwardly projecting portion is, the more minimized the shoving will be. A longer, more pointed triangle eliminates the need for the straight projection portion, but that type of triangle would not fit closely into a cat-litter box corner and most cat urine spots are not an elongated, narrow area, even though they are not necessarily a circular shape. The length of the handle of the cat-litter scooper is preferably 8-inches at least, as a shorter length can interfere with the tilting and scooping action. The entire front part of the scooping-blade, including the straight, forwardly projecting portion and the triangular point, are all in front of the transverse-bend in the scooping-blade, which is preferably about 3¾-inches in length at a minimum; measuring longitudinally from the transverse-bend to frontal the tip of the blade.

Another object of this improved cat-litter scooper is to include a scooping-blade that provides a smooth transition into the containment-bowl portion, and is wide enough in the bottom of the containment-bowl to provide adequate space to hold ample wet cat-litter. The rear part of the scooping-blade, which is behind the transverse-bend and forms the bottom of the containment area is preferably 2–4 inches in length. This could vary according to the variety of shapes of the containment-bowl. The widest part of the containment area, (measured at the transverse-bend) is preferably at least 3¾–4¾-inches in width. If the side-walls are made longitudinally straight, the containment-bowl can be made wider than the scooping-blade, by inwardly converging the right and left opposed side-wings toward the longitudinal center line. A wider containment-bowl is preferable, but if the scooping-blade is too wide it might contribute to unwanted resistance, shoving and traveling of the wet cat-litter causing it to mix undesirably with the dry, clean cat-litter. It is not necessarily preferable for the sides to be made longitudinally straight back, because the wet cat-litter already entrapped in the containment-bowl could more readily slide forward, back onto the scooping-blade. It is preferable for the sides to widen out, starting at or behind the transverse-bend. This expanded contour of the side-walls serves better to entrap and keep the cat-litter contained. The containment-bowl is preferably a minimum of 1½-inches in height, which will allow for several scoops of the wet cat-litter to be taken before the cat-litter scooper needs to be emptied.

D.) Another object of this improved cat-litter scooper is to address the task of scooping up fresh wet spots (less than an hour old); there is an undesirable tendency for some particles of cat-litter to adhere to the blade after the first scoop, making it less sleek, and hence, less effective during subsequent scoops. To diminish this probability, the one piece plastic models are preferably molded in glossy plastic rather than a dull, grained finish; and to further eliminate this probability the plastic is preferably either a polyethylene, or polypropylene, plastic resin. Both of these are inexpensive, relatively non-stick plastics. In the models in which only the scooping-blade portion is made of metal, and the rest of the cat-litter scooper is plastic, it need not be a non-stick plastic for the rest of the scooper, but the metal scooping-blade is preferably a highly polished stainless-steel, which tends to be a somewhat non-stick or otherwise, preferably has a non-stick coating substrate such as TEFLON®. Basically, the secret of this invention success resides in getting the wet cat-litter upon the blade without shoving it, and thus undesirably mixing it into the clean dry cat-litter. The five prime factors combined in this my cat-litter scooper: being comprised of: a.) a very thin scooping-blade, or relatively wide chamfering of the scooping-blades leading edge; b.) no upturned sides at the frontal leading edge; c.) possessing a highly polished stainless-steel scooping-blade, or a non-stick plastic scooping-blade; d.) a flat bottom and a triangular shaped scooping-blade, frontal portion; including inwardly chamfered right and left frontal upright side edges or frontal upright side edges made of thin metal; thereby, enabling my critically configured PIDDLE-PITCHER™ cat-litter scooper to succeed where every other scoopers or trowels fail at this task.

That left the problem of keeping the cat-litter on the scooping-blade long enough to dump it into a receptacle for disposal, since upturned sides on the frontal scooping-blade were not enough; contiguous side-walls "behind" the frontal blade were developed by which to contain the cat-litter. Plus, a transverse-bend in the scooping-blade of preferably approximately 40-degrees, just behind the frontal area of the scooping-blade allows the cat-litter to be tilted aftward into the containment-bowl area having side-walls. The cat-litter has a strong propensity or tendency to stay there until it is dumped out, so that if the user wants to take another scoop at any remaining wet spots, they can do so, until the scoopers containment-bowl is ready to be emptied.

This tendency for the wet cat-litter to remain in the containment-bowl is even more effective if an accentuated recess or sloping down ramp like position is included in the bottom floor, directly behind the transverse-bend in the scooping-blade. This is most economically accomplished if the cat-litter scooper is molded in one-piece plastic, without a metal scooping-blade.

E.) Another object of this improved cat-litter scooper is to provide a handle which preferably extends out from the upper rear of the containment-bowl, preferably angling or slanted upward markedly so as to provide the proper hand clearance for the tilting and scooping that is required to capture the wet cat-litter. Because the cat-litter scooper combines two separate modes of operation; obtaining the wet cat-litter on the scooping-blade, and also sliding it backwards into the containment-bowl, (a two-stage operation) the handle will be in an elevated position at first when the blade is in a horizontal position, going under the wet cat-litter to secure it on the scooping-blade; then secondly, the handle will be lowered to a more horizontal position as the cat-litter scooper is tilted aftward, thereby elevating the scooping-blade. That is why the handle should be positioned at sufficient upward slant as to prevent the users hand from contacting the surface of the cat-litter in the box. The handle preferably extends aftward from the upper-most region of the back-wall of the containment-bowl region at a preferred approximate 40–45-degree pitch attitude; however if the top of the containment-bowl is wider than it's bottom, this will necessitate the handle having an even greater upward slant, unless otherwise compensated for by making the handle more elongated. This is to obtain the correct slant or angle in order to tilt the cat-litter scooper aftwards. This is so that the cat-litter will slide well back into the containment-bowl; and, to avoid the users hand coming into contact with the cat-litter level in the cat-litter box, since that motion requires the handle be tilted much lower than when simply scooping the cat-litter upon the scooping-blade. The shape of the containment-bowl can also effect where the handle will be attached to (or extend from) the containment-bowl wall. This could vary from the lower to the uppermost region of the containment-bowl wall.

On the metal scooping-blade models, the bottom of the cat-litter scooper is preferably as flat as possible on both sides of the transverse-bend. And on the one-piece plastic embodiment, the scooping-blade is also desirably flat on the bottom, although where the recessed containment-area is, when viewed from the side, the scooping-blade aftward portion appears curved; yet in reality, it is flat as it approaches and contacts the litter. For example, a pipe appears curved when viewed from its end, but it is straight where it rolls along a floor, hence the cat-litter scooper needs a flat bottom to make a clean sweep along the bottom of the cat-litter box. Urine is highly acidic, the metal scooping-blade models are preferably polished stainless-steel to prevent corrosion from forming from the urine contained in the cat-litter. Wet cat-litter has an undesirable tendency to adhere to anything it comes in contact with, and polished stainless-steel is a relatively non-stick metal. Although both the one-piece plastic models, and the two-piece plastic with metal scooping-blade models, both have containment-bowls, the metal scooping-blade model has its own metal "side-wings" which insert into upright slots formed in the side frontal edge of the containment-bowl, and does not have inwardly chamfered sides of plastic as do the one piece plastic models. In order not to interfere with the flatness of the bottom of the frontal blade portion on the metal scooping-blade models, the lower lip of the plastic retention slots should be very thinly, chamfered. Or the retention slots can be moved aft and upward, so the lower lips of the slots are not in the actual flow path of the forward movement of the cat-litter scooper active in the cat-litter material. The absence of any bumpy seams or ridges is considered crucial on the bottom of the frontal portion of the scooping-blade. The side-wings which are at the frontal edges of the containment-bowl, prevent the wet cat-litter from falling out of the sides of the blade, as it is tilted to slide rearward. The side-wings should preferably begin approximately 1-inch to 1½-inch at the most in front of the transverse-bend, so that they are back far enough from the frontal leading-edge as to not cause significant drag resistance, much as actual upturned edges at the leading edge would be prone to do.

In the one-piece plastic models, the containment-bowl upright sides extend forward closer to the frontal area of the cat-litter scooping-blade, which forms its own siding along the transverse-bend, thus keeping the cat-litter contained as it is being tilted aftward. So no cat-litter retention "side-wings" are generally required, that area being taken up by the longer sides of the containment-bowl in the plastic models. At the front sides of the containment-bowl, where the sides will first contact the wet cat-litter, it is preferable that the chamfered edge extends up the sides at least 1½-inches, because some people use a high level of cat-litter in the litter box.

A generic variant, of a square shaped scooping-blade is also presented herein. Although when tested, it was not as effective as the triangular shaped scooping-blade, if it has a thin enough scooping-blade, a flat bottom and without upturned sides at the frontal leading edge, it is sufficient. One of the two frontal corners of the square scooping-blade conform to fit into a corner of a conventional, cat-litter box corner. Two generic variant shapes of the containment-bowl are being set forth also; round and square shaped; and a generic variant of the triangular blade embodiment is also set forth without a straight projection area. On the models presented, the frontal sides of the containment-bowl (in the metal scooping-blade models having frontal edges of the side-wings), it has been specifically avoided to have a perpendicular leading-edge; instead, a longitudinally aftward slanting leading-edge is desired. This reduces drag of the frontal sides with the wet cat-litter where it first contacts it, contributing to the desired result of minimal drag resistance, which helps negate any shoving or traveling of the wet cat-litter, causing undesirable mixing with the dry clean cat-litter.

Although the top and bottom of the containment-bowl can be the same width, which will make the sides vertical, it is preferable for the top to be wider than the bottom, creating a somewhat flared-out contour at the top; thereby facilitating easier dumping out of the wet litter it is preferable that the area where the outer perimeter of the bottom of the containment-bowl intersects with the inner interior of containment-bowl, should be as sloping as possible. Any crevices or front-to-rear surface changes where the wet cat-litter could become lodged, should be minimized. This smoothing is easily accomplished in all plastic versions but in the metal scooping-blade models, the horizontal retention-slot where the metal scooper-blade is inserted is also preferably chamfered where it intersects with the plastic bottom sides of the containment-bowl.

In the all plastic, one piece models, the chamfered edges of the blade are essential on both the leading edge of the blade and on the right and left upright sides of the containment-bowl area, but the chamfering is optional on the right and left edges of both the square shaped scooping-blades and straight projection areas.

In the two piece, metal scooping-blade models, the handle can include either a male stud, or female bore, fixed to the upper-most region of the back-wall of the containment-bowl portion.

DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature; wherein:

FIG. 1, is a ¾-left frontal perspective-view of my cat-litter scooper showing a combination plastic and metal embodiment, including phantom outlines indicating a receiver-groove where the two parts are permanently joined;

FIG. 2, is a perspective-view showing an alternate squared shape metal scooper-blade, the relationship of an optional V-shaped leading edge is also indicated via phantom outline;

FIG. 3A, is a first sequence side/elevation-view of my cat-litter scooper, depicting the first phase scooping action of securing the wet cat-litter upon the scooping-blade;

FIG. 3B, is a follow-on second-sequence view to preceding FIG. 3A, depicting the second phase scooping action of next tilting the handle back-downward, thereby spilling the cat-litter aftward into the containment-bowl area;

FIG. 4, is a plan-view showing how both the squared and triangular scooping-blade versions fit neatly into the corners of a conventional cat-litter box, and also depicting both round and heart shaped containment-bowl areas;

FIG. 5, is an upper-left perspective-view of my all plastic cat-litter scooper version having a squared shape containment-bowl area and a triangular-shaped scooping-blade, including a chamfered leading edge which extends up the frontal sides;

FIG. 6, is an enlarged upper-left frontal perspective-view of the all plastic embodiment, featuring a heart-shaped containment-bowl area, including a chamfered-shape blade leading edge which extends up the frontal sides;

FIG. 7, is a side/elevation-view of FIG. 6 embodiment, demonstrating the action of scooping cat-litter upon the scooping-blade portion;

FIG. 8, is an enlarged cross-sectional view taken along reference line 8:8 in FIG. 1;

FIG. 9, is an enlarged, cross-sectional view taken along reference line 9:9 in FIG. 6.

FIG. 10, is a left side/elevation view of the FIG. 6 embodiment;

FIG. 11, is another upper/left perspective-view of my all plastic (or all metal) scooper, showing generic variant features as compared to the FIG. 5 embodiment.

NOMENCLATURE REFERENCES

10—Overall Invention
11/11'—scooping-blade (main flat surface/V'ed projection area)
12/12'—containment-bowl area (formed from plastic/formed from metal)
13/13'/13"—leading edge of V'ed projection (90-degree center/right/left)
14/14'/14"—135-degree blade corner (right/left), transversely squared blade
15/15'—blade retention slots (left/right)
16/16'—blade upper retention-flange
17/17'—blade lower retention-flange
18/18'—containment-bowl sides (right/left)
19/19'/19"—handle shank, hand-grip portion, tubular handle
20/20'—blade frontal chamfers (right/left)
21/21'—blade lateral chamfers (right/left)
22/22'—blade dorsal chamfers (right/left)
23/23'—blade dorsal terminus (right/left)
24—containment-bowl brim
25/25'—containment-bowl back-wall (outer/inner)
26—containment-bowl bottom side
27/27'—cat-litter (fresh/wetted)
28—heart shaped containment-bowl brim
29/29'—median of heart-shaped bowl (peak/vertical division)
30—semi-circular containment-bowl brim
31—squared containment-bowl brim
32/32'—bulged-out side walls (right/left)
33—human hand
34—longitudinal median-axis
35/35'—litter-box (outer rim/inner-wall)
36/36'—transitional-bend (transversely straight/arched)
37/37'—blade-dorsals (right/left)
38—ball-tip
39—attachment-socket

DETAILED DESCRIPTION OF PREFERRED EMBODIMENTS

The presently most preferred embodiment for my cat-litter scooper is the one piece, all plastic heart shaped (in plan-view of FIG. 6) cat-litter scooper with the recessed area in the bottom of the containment-bowl 12, and featuring a 90-degree triangular shaped, planar scooping-blade 11, which is formed to fit conveniently into a conventional cat-litter box corner. The blade triangle positions 13/13'/13" are projected forward along the longitudinal center-line from transverse transitional-bend portions 36/36' (preferably, approximating a 40-degree bend) in the scooping-blade, by forwardly straight projecting portions 21/21' so that the leading edge will not be too close to the beginnings of the upright, or upturned, sides 22/22'. It is a sufficient distance as to negate the undesired shoving of wet litter 27'. The longer the straight, forwardly projecting portion 21/21' is, the more minimized the shoving will be. Accordingly, a longer more narrowly pointed triangle (Such as a 30-degree triangle) eliminates the need for the straight projection portion 21/21'; but that type of triangle would not fit closely into a typical 90-degree cat-litter box corner, and most cat urine spots are not an elongated, narrow area even though they are not necessarily a circular shape. The leading-edge of the scooping-blade 13 has a relatively wide chamfered leading edge 20/20' which extends up the frontal upright sides 23/23' of the containment area 22/22'. The triangular shaped scooping-blade 13/13'/13", will go under the wet cat-litter 27' better than any other shaped scooping-blade will, without shoving it, or causing it to travel onto the clean dry areas; so that only the wet, contaminated areas can be segregated and lifted away. In addition, it allows the user to vary the amount of wet cat-litter 27' to be removed by adjusting the distance of the thrust of the scooping-blade into the cat-litter 27'. For instance, just the tip of the scooping-blade 13, can be used for a smaller wet area, and the larger the wet area is, the further the blade 13 can be shoved under it, allowing for a wider portion of the scooping-blade 11 to accommodate it. When removing even a small amount of wet cat-litter on the tip of the blade 13, the possibility of cat-litter falling off is minimized because it can be slid aftwards into the containment-bowl 18/18', by merely tilting the cat-litter scooper aftwards. Owing to the transverse transitional-bend 36/36' in the blade, and the upright sides 37/37' of the containment-bowl (which begins forming proximal the front of the transverse-bend 36/36') the wet cat-litter 27' is prevented from falling off of the sides 23/23' as it goes sliding aftward over the transverse-bend 36/36'. The recessed area in the bottom of the containment-bowl 32/32' tends to keep the wet cat-litter 27 retained, while additional scoops of wet cat-litter 27 are picked up, or until it is all dumped out. The outwardly canted contours of the sides 32/32' begin preferably at the sides of the transverse-bend 36/36' so they will immediately help entrap the wet cat-litter.

It is considered vital to the performance of this cat-litter scooper 10 that the blades leading-edge 13/13'/13" and 14/14'/14" have no up or down turned edging, rim or beading of any sort, no matter how slight; as the thinness of this leading-edge 13/13'/13" or 14/14'/14" is essential in enabling the scooping-blade 11 to slide readily into the wet cat-litter 27', with minimal disturbance.

The transverse-bend 36/36' in the scooping-blade should be preferably formed without a deep crevice where wet cat-litter 27' could become lodged, and the bend should be made smooth as possible.

Having the containment-bowl 12/12' wider than the scooping-blade 11 is preferable because a more flared-out contour at the sides will better entrap the wet cat-litter 27' in the rear of the scooper 25/25', when again tilted forward, level with the plane of the cat-litter 27 surface, just as the recessed area in the bottom of the containment-bowl 32/32' will assist in this action.

It is possible for the triangular scooping-blade models 13/13'/13" to function satisfactorily without the straight, forward, projection area 21/21'; and instead, for the triangle 13/13'/13" to emerge directly out of the straight transverse-bend 36/36', but the cat-litter scooper 10 would have to be made exceptionally wide, (a minimum of approximately 6 inches, in width at the transverse-bend 36/36'.) When a prototype was tested, eliminating the straight lateral projection 21/21' from the triangle 13/13'/13", (but still retaining a 90-degree right to left leading edge 13 that would fit perfectly into a corner of a conventional standard cat-litter box), the scooping-blade was somewhat short and stubby, when the width of the transverse-bend 36/36' is that of the average commonly available cat-litter scooper. For the scooping-blade 11/11' to have enough length to be useful, it requires the triangle 13/13'/13" to be widened to a markedly larger size, making the width (at the transverse-bend 36/36') rather wide for a cat-litter scooper. The width that is required in this case (a minimum of 6-inches wide at the transverse-bend 36/36') lends a somewhat "unhandy" feel to the cat-litter scooper 10. An additional reason that a short, stubby triangle should be avoided (aside from too little surface to levy the cat-litter), is that an adequate length is required to avoid the frontal part of the scooping-blade 13/13' being too close to the beginnings of the frontal upturned sides 37/37', which could cause undesired shoving and resulting traveling of the wet cat-litter 27.

The point of the triangular scooping-blade 13/13'/13" is configured to fit closely into the right-angle corner of a standard cat-litter box. If there is a slight variation in the dimensions of the cat-litter box corner, then there should be a corresponding variation in the dimensions of the leading edge of the triangular scooping-blade so that it will fit intimately into the cat-litter box corner. Even though a transversely straight across scooping-blade 14" is not as effective as the triangular shape 13/13'/13" at getting under the cat-litter without shoving it. The preferred two straight lateral sides of the triangular blade 13'/13" 14/14' are effective in scooping up wet cat-litter 27' resting up against the sides of the litter-box 35', because the box-sides 35' act as a brace or back stop, so that the cat-litter 27' can be scooped up, without being shoved. Advantageously, there is virtually no area of the cat-litter box which can not be cleaned of wet cat-litter 27' with the triangular scooping-blade 13/13'/13". Reference to FIG. 1 shows my cat-litter scooper 10 in a two-piece version comprising a one-piece injection-molded plastic aftward body portion forming side-walls 18 and 18', a rear-wall 25 and adjoining aftwardly extending handle portion 19. This embodiment features a continuous integrally-molded receiver-channel slot 16 (right side) and 16' (left side) and a transverse interconnecting portion 16"; which arrangement is further detailed in FIG. 8. In FIG. 2 I show the one-piece metal scooper-blade alone (prior to installation into the aftward body) with the frontal portion of the scooping-blade shown in an alternative squared shaped configuration, having transverse leading-edge 14' extending from opposed right 14 and left 14' corners, and with a transitional bend 36 in the scooping-blade.

Reference to the two-sequence views of FIGS. 3A/B shows my cat-litter scooper 10 in the two-piece construction as depicted in FIG. 1. The optional two-piece construction is shown in FIG. 3A, demonstrating the action of the cat-litter scooper loading the wet cat-litter 27' upon the frontal portions 11/11' of the scooping-blade. This is the most primary function of my cat-litter scooper 10, because all other tools tested could not properly secure the cat-litter upon their scooping-blade surface without disturbing clean areas. In FIG. 3B I further show my cat-litter scooper 10 demonstrating the vital secondary action of the wet, now more dense, cat-litter sliding and tumbling aftward over the transitional bend in the scooping-blade 36/36' and "captively" back into the containment-bowl portion 18/18' of the cat-litter scooper. Study of FIG. 4 shows both the optional squared 14' and preferred triangular 13/13'/13" shaped frontal scooping-blade, with the containment-bowl areas shown both optionally heart shaped 28 and optionally round shaped 30, depicting how the two different shaped scooping-blades can both fit into the corners of a conventional cat-litter box 35. This is important because cat urine tends to fan out into any crevices it might be close to. My cat-litter scooper 10 is designed to effectively reach and relieve all areas of the cat-litter box of any urine and feces present.

Reference to FIG. 5 shows my cat-litter scooper in a one-piece resilient molded plastic construction embodiment, here with the triangular V-shaped frontal scooping-blade 13/13'/13" having leading edge chamfering 20/20'/20" and the lateral straight projection areas 14/14', making transition into aftward dorsal blades 22/22'; thereby facilitating easy ingress of the cat-litter 27' without disturbing surrounding areas of clean cat-litter. The transitional bend is shown leading into the containment-bowl area which is here shown square shaped 31.

Looking now at FIG. 6, I show my cat-litter scooper in its preferred embodiment, of one-piece injection-molded plastic construction with the triangular shaped frontal scooping-blade 13/13'/13" and the optionally bulged out side-walls 32/32' forming a heart shaped containment-bowl area 28. Also shown are the V-shaped leading edge chamfers 20/20' which preferably extend up the integrally formed frontal blade dorsals 22/22'. In front of the scooping-blade dorsals 22/22', the straight lateral projection portions 21/21' extend the triangle out to give the scooping-blade needed length, assuring it will fit into a cat-litter box corner; even though the cat-litter scooper has bulged-out side-walls 32/32' which might otherwise interfere.

Study of FIG. 7 shows the cat-litter scooper of FIG. 6, demonstrating the cat-litter 27' being scooped upon the frontal portions 11/11' of the scooping-blade.

Reference to FIG. 8 shows how the metal scooping-blade dorsals 37/37' are inserted into retention slots 15/15' of the containment-bowl sides 18/18'. Note how the molded lips 16/16' cooperate with the molded lower lips 17/17' to secure the thin and relatively flimsy planar metal-blade portions 11, and dorsals 37/37'. The bottom lips of the retention slots 17/17' are preferably as thin or as smoothly chamfered toward the front of the cat-litter scooper as possible, enabling the scooping-blade to move intimately against the floor of the cat-litter box. Another option to facilitate this, is to arrange the slots 15 further aftward under the containment-bowl area, where they will not interrupt smoothness of the blade.

In FIG. 9 I show an enlarged, frontal cross-section view of the one-piece molded-plastic construction according to FIGS. 5, 6, 10, showing the scooping-blade portions 11/11', containment-bowl side portions 18/18' and dorsal blade chamfers 22/22'.

In FIG. 10 is shown the preferred relationship between structural elements of my cat-litter scooper 10. Wherein for example, owing to my extensive studies regarding the two-phase operation of my cat-litter scooper tool, it is important here to review the procedure as follows: 1.) Skimming along beneath the surface of the cat-litter to pick-up wetted cat-litter and cat feces (as in FIG. 3A); -then, 2.) tilting-back about 45-degrees to shift the collected refuse aftward into the containment-bowl area 36 of the hand tool 10 (as in FIG. 3B). In order to provide adequate human-engineering that involves initial ease of skimming, (ref FIG. 3B), I have determined a preferred handle pitch-angle of approximately 45-degrees (see FIG. 10 ref-arrow indication), plus I prefer to locate my optional handle attachment-socket 39, at the highest possible position relative to rear-wall 25 of the scooper 10, in order to gain maximum hand clearance from the cat-litter.

Since some elderly people have difficulty leaning over during the cat-litter clean-up procedure, I have devised a tubular handle portion 19" which can be 15–20 inches in length, preferably finished with a ball-tip 38. The advantage of the preferred integrally-molded attachment-socket 39, resides in it's enabling the user to pull the forward tubular handle 19" terminus from the attachment-socket 39, so as to then simply cut several inches from the handle 19" if one prefers the closer controllability of a shorter, perhaps only 12-inch long handle for example. Once the tubular handle 19" is cut (simply using a kitchen bread-knife if convenient), the user then merely presses the handle terminus permanently back into attachment-socket 39. The FIG. 10 configuration is similar to the embodiment of FIG. 5 except that I have less steeply (more gradually) angled the preferred dorsal-blade portions 37'1 (right and left); which effects a more forwardly projecting length. The cross-section of FIG. 9 reveals how I prefer shaping the all plastic dorsals 37 and 37' (see FIG. 6) with inwardly facing chamfering 22 and 22'.

Reference to FIG. 11 shows my cat-litter scooper in a one-piece resilient molded-plastic construction embodiment, here with the triangular V-shaped frontal blade 13/13'/13" having leading edge chamfering 20/20'/20". The containment-bowl portion 24, is shown square shaped while the triangular scooping-blade portion 11', projects directly out of the aftwardly arched, transverse bend 36'.

What is claimed is:

1. A hand-held cat-litter scooping-tool device providing more effective sifting of non-clumping type cat-litter, employing a critical combination of scooping and containment contours and dimensions facilitating a unique two-stage operation minimalizing migration of cat wetted areas into clean dry areas within an existing cat-litter box, first segregating by submerging beneath a wetted-spot, then tilting aft to thereby separately contain and lift away only the wetted cat-litter; said device comprising:

an imperforate planar scooping-blade portion projecting medially forward from an imperforate transverse transitional-bend contouring of approximately 30–45 degrees, plus imperforate right and left side-wall portions formed oppositely aftward of said transverse transitional-bend contouring and contiguously with an imperforate transverse rear-wall portion of approximate 1½-inch minimum height, and an imperforate bottom portion forming a containment-bowl portion of approximate minimum 3½-inch width arranged proximally aft of said transitional-bend contouring; and, a handle portion arranged along the medial longitudinal-axis of the scooping-tool device and extending aftward from said rear-wall portion of said containment-bowl portion at an attitude preventing a user's hand contacting the cat-litter surface during a tilting aft sequence of operation.

2. The cat-litter scooping-tool device according to claim 1, wherein the leading-edge of said scooping-blade portion is formed to an approximate 90-degree triangular-shape as viewed from above, and includes a radiused-tip means by which to fit closely into corners of the cat-litter box.

3. The cat-litter scooping-tool device according to claim 1, wherein said scooping-blade portion is formed in plan-view with a 90-degree triangular shape, with ⅜th-inch to ¾-inch long side projections arranged approximately parallel to said medial longitudinal-axis, including radiused-tip means by which to fit closely into corners of the cat-litter box.

4. The cat-litter scooping-tool device according to claim 1, wherein the leading-edge of said scooping-blade portion is formed at a right-angle to said medial longitudinal-axis, while arranged forward from approximately straight side portions projecting approximately parallel to said longitudinal-axis as viewed from above.

5. The cat-litter scooping-tool device according to claim 1, wherein said scooping-blade portion is made of a thin approximately ¹⁄₆₄th–¹⁄₃₂nd gauge metal permanently inserted into both a transverse retention-slot formed into the horizontal leading edge of an injection-molded said containment-bowl portion, while co-supporting upright retention-slots are formed into the right and left leading-edges of the said sidewall portions comprising a portion of said containment-bowl portion.

6. The cat-litter scooping-tool device according to claim 1, wherein said scooping-blade portion, said containment-bowl portion, said left and right sidewall portions and contiguous said rear-wall portion are integrally formed of injection-molded plastic resin material; while said handle portion is made of a hollow-tube member fixedly fitted to an attachment-socket formed upon the backside of said rear-wall portion.

7. The cat-litter scooping-tool device according to claim 1, wherein said scooping-blade portion, said containment-bowl portion, said left and right sidewall portions and contiguous said rear-wall portion are integrally formed of thin approximately ¹⁄₆₄th–¹⁄₃₂nd inch gauge metal.

8. The cat-litter scooping-tool device according to claim 1, wherein said handle portion projects aftward at an approximate 45-degree upward angle relative to the plane of the forwardly projecting position of said scooping-blade portion, thereby facilitating hand clearance above the cat-litter surface when said scooping-blade portion is turned upward at its leading edge during said tilting aft sequence.

9. The cat-litter scooping-tool device according to claim 1, wherein said containment-bowl portion appears rounded as viewed from above.

10. The cat-litter scooping-tool device according to claim 9, wherein said rounded containment-bowl portion appears as two united right and left halves, forming an upper-half portion of a heart-shape as viewed from above.

11. The cat-litter scooping-tool device according to claim 1, wherein said scooping-blade portion is made of a thin-gauge metal coated with a non-stick substrate substance to reduce tendency of cat-litter adhering to the surface of said scooping-blade portion.

12. The cat-litter scooping-tool device according to claim 1, wherein the leading-edge of said scooping-blade portion includes an upper-surface chamfering of approximate ⅛th–¼ inch longitudinal width, thereby more effectively ramping said wet cat-litter thereupon.

13. The cat-litter scooping-tool device according to claim 1, wherein said transverse transitional-bend contouring is formed in a semi-circular shape describing an aftwardly directed arch as viewed from above, thereby increasing the effective longitudinal-length of said scooping-blade portion while reducing lateral spillage of said collected cat-litter during said aftward tilting sequence.

14. A hand-held cat-litter scooper-tool device facilitating more conservative use of non-clumping cat-litter via a two-stage operation, by first submerging beneath the wetted cat-litter, secondly tilting aftward to segregate and shift collected cat-litter aft into a containment portion; said device comprising:

an imperforate planar scooping-blade projecting forward a minimum of approximately 3-inches from an imperforate transverse transitional-bend portion, including radius means by which to fit closely into corners of an existing cat-litter box;

imperforate right and imperforate left sidewall portions formed contiguously with an imperforate transverse rear-wall portion, and an imperforate bottom portion thereby forming a containment-bowl portion arranged proximally aft of said transverse-bend portion;

a handle portion arranged along the medial longitudinal-axis of the scooper-tool extending aftward from said rear-wall portion of said containment-bowl portion at an attitude preventing a user's hand contacting the cat-litter surface during the second-stage aftward tilting mode of operation.

15. The cat-litter scooping-tool device according to claim 14, wherein the scooping-blade is formed in plan-view with a 90-degree triangular shape, and including ⅜th-inch to ¾-inch long side projections arranged approximately parallel with said medial longitudinal-axis.

16. The cat-litter scooping-tool device according to claim 14, wherein the leading-edge of said scooping-blade is formed transversely at a right-angle to said medial longitudinal-axis, while arranged forward from approximately straight side portions projecting approximately parallel to said longitudinal-axis as viewed from above.

17. The cat-litter scooping-tool device according to claim 14, wherein said scooping-blade is made of a thin 1/64th–1/32nd gauge stainless-steel permanently inserted into both a transverse retention-slot formed into the horizontal leading edge of an injection-molded said containment-bowl portion, while co-supporting upright retention-slots are formed into the right and left leading-edges of the said sidewall portions comprising a portion of said containment-bowl portion.

18. The cat-litter scooping-tool device according to claims 14, wherein said transverse transitional-bend portion is formed in a semi-circular shape forming an aftwardly directed arch as viewed from above; thereby reducing lateral spillage of said collected cat-litter during said aftward tilting mode.

19. The cat-litter scooping-tool device according to claim 14, wherein the leading-edge of said scooping-blade includes an upper-surface chamfering of approximate ⅛th–¼ inch longitudinal width, thereby more effectively ramping said wet cat-litter thereupon.

20. A two-stage method for effectively segregating and lifting away wetted cat-litter material from an existing cat-litter box via a hand-held imperforate scooper-tool configured to minimize migration of wetted cat-litter into clean dry areas of the cat-litter; said method comprising:

firstly, moving the scooper-tool's imperforate scooping-blade forward proximal the bottom of said cat-litter box as to thereby position the wetted cat-litter upon the upper surface of said scooping-blade; secondly, lowering of the scooper-tool's aftwardly extending longitudinal handle portion to a near horizontal pitch attitude, thereby tilting said scooping-blade's leading-edge upwardly to an approximate 40-degree pitch attitude causing collected wetted cat-litter to tumble aftwardly over a transitional-bend into a containment-bowl portion formed within sidewalls of said scooping-tool, for lifting away and subsequent disposal.

* * * * *